H. SOLTOFT.
EDUCATIONAL APPLIANCE.
APPLICATION FILED APR. 9, 1917.

1,244,000. Patented Oct. 23, 1917.

Inventor,
Henriette Soltoft.
By Hull, Smith, Brock & West
Attys.

UNITED STATES PATENT OFFICE.

HENRIETTE SÓLTOFT, OF CLEVELAND, OHIO.

EDUCATIONAL APPLIANCE.

1,244,000.

Specification of Letters Patent. Patented Oct. 23, 1917.

Application filed April 9, 1917. Serial No. 160,626.

*To all whom it may concern:*

Be it known that I, HENRIETTE SÓLTOFT, a subject of the King of Denmark, at present residing at Cleveland, in the county of Cuyahoga and State of Ohio, have invented a certain new and useful Improvement in Educational Appliances, of which the following is a full, clear, and exact description, reference being had to the accompanying drawings.

This invention relates to an educational appliance or device for teaching children the value and use of numbers.

The invention is founded upon the well established fact that one of the earliest mental faculties developed in a child is that of comparison. The fundamental object of the invention, therefore, is to provide an appliance through which this faculty is utilized for the purpose of teaching children the value of numbers.

Further objects are to provide a device or appliance through which the child may be taught the value of certain combinations of digits of different orders; and to further convey to the child's mind, in a comprehensive yet simple manner, the principle of addition.

A still further and more limited object is to embody the invention in a simple, economical and convenient form that is well adapted to the use of small children.

Figure 1:
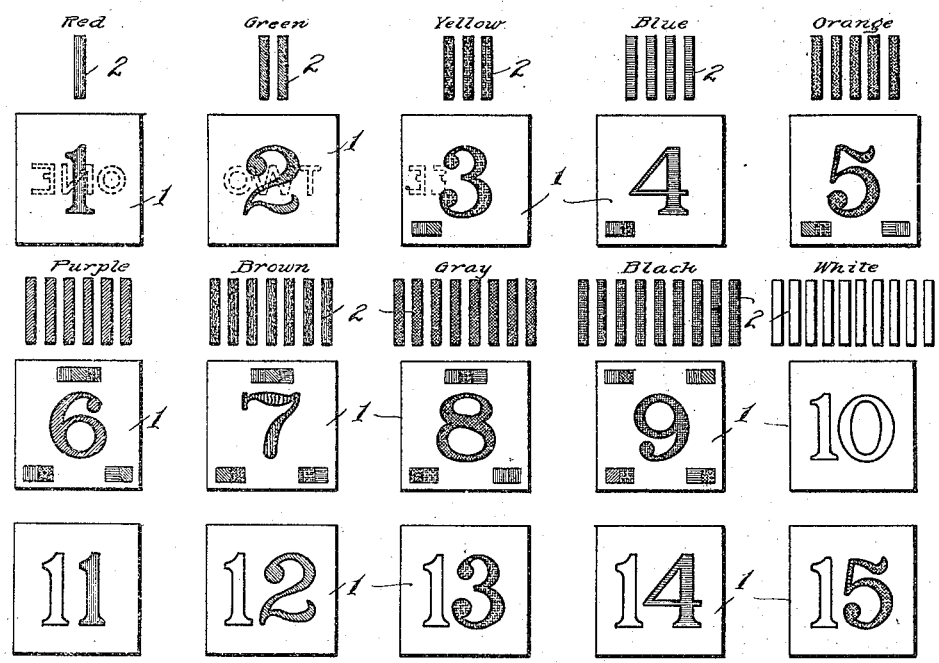
Figure 2:
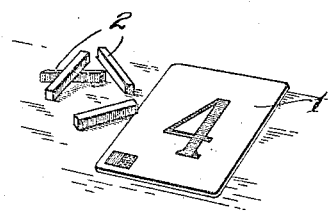
Figure 3:
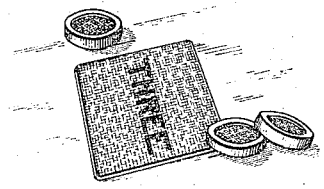
Figure 4:
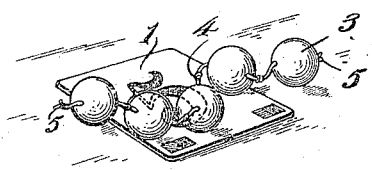

More generally, the invention may be said to consist of the combinations of elements set forth in the annexed claims and illustrated in the accompanying drawing wherein Figure 1 represents a collection of elements constituting an embodiment of the invention; Fig. 2 is a perspective view of certain of the elements shown in Fig. 1; and Figs. 3 and 4 are similar views of modified forms.

The general scheme is to provide a series of cards or members, each bearing a number, and to associate with each card or member objects corresponding in number to the number on the card or member, and to provide each card or member and the objects associated therewith with a like mark of identification, so that a child having the cards or members and the objects before him, may sort out the objects bearing like marks of identification, and may select the card or member having the corresponding feature of identification, and by comparing the two has impressed upon his mind the fact that the number on the card represents the number of objects which comprises the group associated with that card.

In the embodiment of the invention illustrated in Figs. 1 and 2, 1 represents the cards or members and 2 the objects which may be in the form of small wooden sticks or some suitable equivalent thereof, and in the present modification of the invention the sticks and the numeral upon the corresponding card or member are of the same color. The colors are conventionally represented in the drawings and for convenience the name of the color which constitutes the mark of identification of each group of objects and its corresponding card is placed above such group.

I may also print or inscribe the name of the number upon the card, preferably upon its reverse side, so that as the child progresses he may learn, as well as the numeral the word representing the number.

Now, for the purpose of teaching the child addition, I join together and place upon certain of the cards or members the marks of identification borne by the cards or members having respective numbers combining to produce the number appearing upon the card or member so marked. For instance, upon the "5" card is inscribed a mark displaying the colors green and yellow, indicating that all of the green objects and all of the yellow objects make up a group comprising the same number of objects as those constituting the group associated with the "5" card.

It will be seen that objects are associated only with the cards bearing respectively the numerals "1" to "10," and that the inscription upon each card is, of course, of a color which differs from the rest. Observe the card bearing the number "11." It will be seen that the digit of the "tens" order corresponds in color to the number on the "10" card, and that the digit of the "units" order is of a color corresponding to that on the "1" card, meaning that the objects in the groups associated with the respective cards combine to make up a group of eleven. This idea follows on up through the "teens," and so on.

While, at the present time, I prefer to use cards and possibly wooden sticks as the elements of the appliance, any suitable equivalents of these may be employed as, for instance hard rubber chips for either or both the members 1 and the objects 2, or the objects may be pasteboard disks or the like, as shown in Fig. 3. In some cases it might be found advantageous to connect the objects of each group together so as to avoid loss or undue separation of the objects of the group and thereby create a doubt in the child's mind as to the value of a number. Such a modification is illustrated in Fig. 4 where the objects constitute beads 3 that are threaded upon a string 4, knotted at the ends, as shown at 5, to hold the beads upon the strings.

While I have stated that the objects, and the numerals or inscriptions upon the cards possess colors of identification, it is clear that other means of recognition may be substituted without departing from the invention, as for example the cards themselves may be of various colors, while the printing on all is of the same color. In such a case, each card above "10" would have to bear a combination of colors in order to identify the digits. The foregoing slight departure from the present showing is so obvious that specific illustration is deemed unnecessary.

Having thus described my invention, what I claim is:

1. An educational appliance consisting of a series of members each bearing an individual number, objects associated with each member and corresponding in number to the number on the member, each member and its associated objects bearing like marks of identification.

2. An educational appliance consisting of a series of members each bearing an individual number, objects of like color associated with each member and corresponding in number to the number on the member, each member also bearing the color of its associated objects.

3. An educational appliance consisting of a series of members each bearing an individual number and the name of such number, objects associated with each member and corresponding in number to the number on the member, each member and its associated objects having like marks of identification.

4. An educational appliance consisting of a series of members each bearing an individual number, the numbers progressing from "1" upward of "10," objects associated with each member from "1" to "10" and corresponding in number to the number on the member, the inscription on each member having a distinguishing quality of which the objects associated with that member are possessed, the numbers on the members above "10" comprising a "tens" digit having the same distinguishing quality as the inscription of the "10" member and a "units" digit having the same distinguishing quality as the inscription on the card bearing the number corresponding to that digit.

5. An educational appliance consisting of a series of members each bearing an individual number, the numbers progressing from "1" upward of "10," objects associated with each member from "1" to "10" and corresponding in number to the number on the member, each member and its associated objects bearing like marks of identification, the numbers on the members above "10" having the digits of the respective orders possessed of a mark of identification corresponding to the mark of the member carrying the number corresponding to that digit.

6. An educational appliance consisting of a series of members each bearing an individual number, a number of objects connected together and associated with each member and corresponding in number to the number on the member, each member and its associated objects bearing like marks of identification.

7. An educational appliance consisting of a series of members each bearing an individual number, objects associated with each member and corresponding in number to the number on the member, each member and its associated objects having distinguishing qualities, and certain of the members carrying each an indication comprising a combination of the distinguishing qualities of the members bearing jointly numbers aggregating the value of the member carrying such indication.

In testimony whereof, I hereunto affix my signature.

HENRIETTE SÓLTOFT.

Copies of this patent may be obtained for five cents each, by addressing the "Commissioner of Patents, Washington, D. C."